T. L. Gray,

Bee Hive.

No. 98,052. Patented Dec. 21, 1869.

Witnesses:
Gustave Dietrich
Alex T. Roberts

Inventor:
T. L. Gray
Per Munn & Co
Attorneys.

United States Patent Office.

THOMAS L. GRAY, OF THOMASVILLE, TENNESSEE.

Letters Patent No. 98,052, dated December 21, 1869.

IMPROVEMENT IN MILLER-TRAP FOR BEE-HIVES.

The Schedule referred to in these Letters Patent and making part of the same.

*To all whom it may concern:*

Be it known that I, THOMAS L. GRAY, of Thomasville, in the county of Cheatham, and State of Tennessee, have invented a new and improved Miller-Trap for Bee-Hives; and I do hereby declare that the following is a full, clear, and exact description thereof, which will enable others skilled in the art to make and use the same, reference being had to the accompanying drawing, forming part of this specification.

This invention relates to a device for catching millers, or other insects, in their attempts to gain entrance into bee-hives; and consists in the construction and arrangement hereinafter described.

In the accompanying drawing—

Similar letters of reference indicate corresponding parts.

Figure 1:
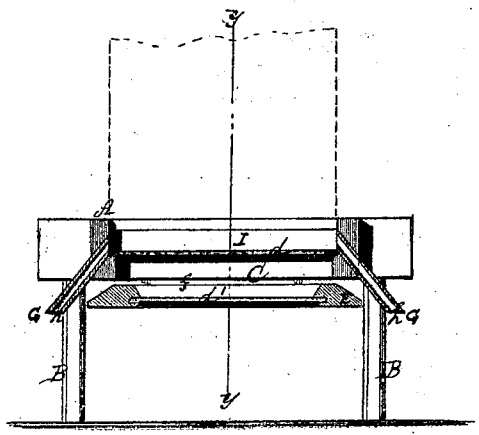
Figure 1 is a vertical section of the device through the line $x\ x$ of fig. 2.
Figure 2:
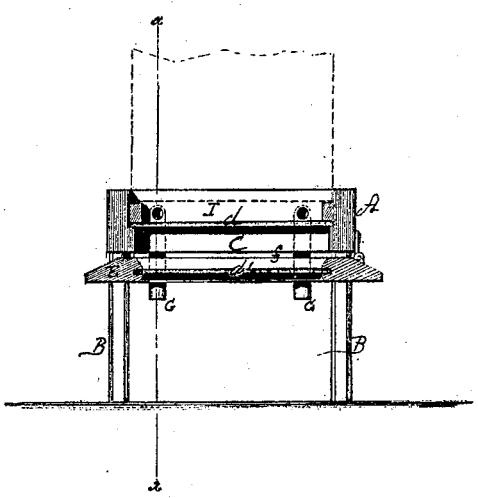
Figure 2 is a vertical section, taken through the line $y\ y$ of fig. 1.

This trap is designed for the foundation or stool of the hive, the position of the hive being shown in dotted lines. It consists of a horizontal frame, A, elevated on legs B, containing a chamber, C, with the top and bottom of glass.

$d\ d$ represent the glass plates.

The bottom plate $d'$ is attached to the apron-piece E, which projects on every side, to form a landing-place for the millers.

This apron is so attached to the frame A that a narrow space is left, as seen at $f$, through which the millers, in seeking, will pass and find themselves in the chamber C, instead of in the hive.

The bee-entrance is through the inclined tubes G, (more or less in number,) with the openings in their under sides, as seen at $h$, with their other ends opening into the space I above the chamber C, and immediately beneath the hive.

The chamber C will be lighted by means of the glass plates, and the millers will overlook the true bee-entrance and enter the lighted chamber C, where they will be entrapped.

The hive should be made so that it will properly fit the frame or trap, and when thus placed, the bees are allowed to pursue their work unmolested by the millers.

The device is a perfect protection against all insects which are disposed to enter the hive.

Having thus described my invention,

I claim as new, and desire to secure by Letters Patent—

The combination of inclined entrance-tubes G, apron E, and chamber C, having transparent ceiling and floor, arranged as shown and described.

T. L. GRAY.

Witnesses:
B. F. WRIGHT,
WM. MANWARING.